United States Patent
Fan

(10) Patent No.: US 12,328,030 B1
(45) Date of Patent: Jun. 10, 2025

(54) EMERGENCY PROTECTION SYSTEM FOR UPS

(71) Applicant: Fanshi Technology Development Co., Ltd., Shanxi (CN)

(72) Inventor: Feng Fan, Shanxi (CN)

(73) Assignee: FANSHI TECHNOLOGY DEVELOPMENT CO., LTD., Shanxi (CN)

( * ) Notice: Subject to any disclaimer, the term of this patent is extended or adjusted under 35 U.S.C. 154(b) by 0 days.

(21) Appl. No.: 19/060,130

(22) Filed: Feb. 21, 2025

Related U.S. Application Data

(63) Continuation of application No. PCT/CN2025/077309, filed on Feb. 14, 2025.

(30) Foreign Application Priority Data

Oct. 23, 2024 (CN) .......................... 202411480867.1

(51) Int. Cl.
*H02J 9/06* (2006.01)
*H02J 7/00* (2006.01)
*H02M 1/32* (2007.01)
*H02M 5/458* (2006.01)

(52) U.S. Cl.
CPC ............ *H02J 9/062* (2013.01); *H02J 7/0063* (2013.01); *H02M 1/32* (2013.01); *H02M 5/458* (2013.01)

(58) Field of Classification Search
CPC .......... H02J 9/062; H02J 7/0063; H02M 1/32; H02M 5/458
USPC ............................................... 307/64
See application file for complete search history.

(56) References Cited

U.S. PATENT DOCUMENTS

| 12,149,117 B1* | 11/2024 | Fan ........................ H02J 9/06 |
| 2023/0369862 A1* | 11/2023 | Richmond ............ H02J 3/0012 |

\* cited by examiner

*Primary Examiner* — Michael R. Fin

(57) ABSTRACT

An emergency protection system for UPS, including a power module for supplying power; a power control module for controlling the transmission of power; a power status detection module for detecting whether an abnormality in the power has occurred; a voltage change detection module for detecting whether a sudden change in the power has occurred; a timing detection module for detecting, in the event of an abnormality in the power, whether the duration of no sudden changes in power exceeds a timing length; a micro-control module for signal reception and module control; a power distribution control module for supplying power to an energy storage module and transmitting the power released by the energy storage module, and for high-frequency power regulation processing of the power released by the energy storage module; and an output processing module for superimposing, inverting, and outputting power.

7 Claims, 2 Drawing Sheets

EMERGENCY PROTECTION SYSTEM FOR UPS

CROSS REFERENCE TO RELATED APPLICATIONS

The present application is a continuation of International (PCT) Patent Application No. PCT/CN2025/077309, filed on Feb. 14, 2025, which claims the priority of Chinese patent application No. 202411480867.1, filed on Oct. 23, 2024, and the entire contents of which are hereby incorporated by reference in their entireties.

TECHNICAL FIELD

The present disclosure relates to the technical field of UPS, and more specifically to an emergency protection system for the UPS.

BACKGROUND

An uninterruptible power supply (UPS) is an AC power source that includes energy storage equipment. It can provide an uninterrupted power supply to a load during a power outage by means of the energy storage equipment such as batteries, such that the load can operate normally and is protected from damage due to power outages. However, existing UPSs generally use the energy storage equipment for emergency power supply when the input power supply is disconnected or there is a power supply abnormality, such that it is impossible to control the power supply mode of the energy storage equipment according to the power supply status of the input power supply, which results in high consumption of the energy storage equipment, reducing its service life and easily shortening the power supply duration of the UPS, which is required to be improved.

SUMMARY OF THE DISCLOSURE

The embodiments of the present disclosure provide an emergency protection system for UPS to solve the problems raised in the above background technology.

An emergency protection system for an uninterruptible power supply, including: a power module, a power control module, a voltage change detection module, a power status detection module, a timing detection module, a micro-control module, a power distribution control module, an energy storage module, and an output processing module;
wherein the power module is configured to be connected to alternating current power and perform step-down and rectification processing on the alternating current power;
the power control module is connected to the power module and the micro-control module; and is configured to transmit power after the rectification processing by the power module, and stop transmitting the power in response to receiving a discharge signal output by the micro-control module;
the power status detection module is connected to the power module and the micro-control module; and is configured to perform a phase-shifting process on a first reference signal output by the micro-control module, perform a voltage division process on the power after the step-down processing by the power module and superimpose the power after the voltage division process with the first reference signal after the phase-shifting process to output a first potential signal, and output a first control signal in condition of a potential of the first potential signal not being zero;
the voltage change detection module is connected to the power module and is configured to perform another voltage division process and another phase-shifting process on the power after the step-down processing by the power module, superimpose a signal output after the other voltage division process with a signal output after the other phase-shifting process to output a second potential signal, and output a second control signal in condition of a potential of the second potential signal not being zero;
the timing detection module is connected to the voltage change detection module and the power status detection module; and is configured to output a third control signal in condition of a time period for which the first control signal is received and the second control signal is not received exceeds a timing length;
the micro-control module is connected to the timing detection module, the voltage change detection module, and the power distribution control module; and is configured to output the discharge signal and control the power distribution control module to discharge in condition of the first control signal or the second control signal being received, output a first pulse signal and stop outputting the discharge signal in condition of the third control signal being received, output a charging signal in condition of neither the first control signal nor the second control signal being received, and provide the first reference signal;
the power distribution control module is connected to the power control module, the energy storage module, and the output processing module; and is configured to transmit power transmitted by the power control module to the energy storage module in response to receiving the charging signal, transmit power released by the energy storage module to the output processing module in response to receiving the discharging signal, and perform a high-frequency regulation processing on the power released by the energy storage module in response to receiving the first pulse signal;
the energy storage module is configured to store power and discharge;
the output processing module is connected to the power control module; and is configured to superimpose the power transmitted by the power control module with power after the high-frequency regulation by the power distribution control module, and perform an invert processing on power output after the superimposing, power transmitted by the power distribution control module, and the power transmitted by the power control module and transmit power after the invert processing to a connected electrical equipment.

In some embodiments, the power module includes a power supply interface, a first transformer, and a full-wave rectifier; the power control module includes a first field-effect transistor, a first resistor, a ninth transistor, and a first diode; the micro-control module includes a control chip;
a first end and a second end of the power supply interface are connected to a first end and a second end of a primary side of the first transformer, and a first end and a second end of a secondary side of the first transformer are connected to a first end and a second end of the full-wave rectifier; a third end of the full-wave rectifier is connected to a drain of the first field-effect tube, and connected to a gate of the first field-effect tube and a collector of the ninth transistor via the first resistor; an emitter of the ninth transistor is grounded, and a base of the ninth transistor is connected to a cathode the first diode; an anode of the first diode is connected to an I01 terminal of the control chip, and a source of the first field-effect tube is connected to the output processing module and the power distribution control module.

In some embodiments, the power distribution control module includes a bidirectional converter, a second transformer, a second diode, and a second field-effect tube; the energy storage module includes an energy storage equipment;
a first end of the bidirectional converter is connected to the source of the first field-effect tube, a second end of the bidirectional converter is connected to a first end of the energy storage equipment and a first end of a primary side of the second transformer, and a second end of the energy storage equipment and a source of the second field-effect tube are both grounded; a second end of the primary side of the second transformer is connected to a drain of the second field-effect tube; a first end of a secondary side of the second transformer is connected to an anode of the second diode, a cathode of the second diode is connected to the output processing module, and a second end of the secondary side of the second transformer is grounded; a third end of the bidirectional converter is connected to the I01 terminal of the control chip, and a fourth end of the bidirectional converter is connected to an I02 terminal of the control chip; a gate of the second field-effect tube is connected to an I03 terminal of the control chip.

In some embodiments, the output processing module includes a second capacitor, a third capacitor, a sixth resistor, a seventh resistor, an inverter, and an output port;
a first end of the second capacitor is connected to a first end of the inverter and the source of the first field-effect tube, and connected to a second end of the second capacitor, an end of the seventh resistor, an end of the third capacitor, and the cathode of the second diode via the sixth resistor; another end of the seventh resistor, another end of the third capacitor, and a second end of the inverter are all grounded; a third end and a fourth end of the inverter are connected to a first end and a second end of the output port.

In some embodiments, the voltage change detection module includes an eighth resistor, a ninth resistor, a tenth resistor, an eleventh resistor, a twelfth resistor, a thirteenth resistor, a fourteenth resistor, a first operational amplifier, a fifteenth resistor, a sixteenth resistor, a nineteenth resistor, a second power supply, a fourth transistor, a fifth transistor, and a sixth transistor;
an end of the eighth resistor is connected to the second end of the secondary side of the first transformer, and another end of the eighth resistor is connected to an end of the ninth resistor and an end of the tenth resistor, and is connected to an end of the fourteenth resistor, a base of the fourth transistor, and an emitter of the fifth transistor via the fifteenth resistor; another end of the ninth resistor is connected to an end of the eleventh resistor, and connected to an inverting terminal of the first operational amplifier via the fourth capacitor; a non-inverting terminal of the first operational amplifier is connected to an end of the twelfth resistor, and connected to another end of the fourteenth resistor and an output of the first operational amplifier via the thirteenth resistor; an emitter of the fourth transistor is connected to a collector of the fifth transistor and a base of the sixth transistor, and connected to the second power supply and an emitter of the sixth transistor via the sixteenth resistor; a collector of the sixth transistor is connected to an I07 terminal of the control chip and an end of the nineteenth resistor; another end of the nineteenth resistor, a base of the fifth transistor, another end of the twelfth resistor, a Bluetooth of the eleventh resistor, and another end of the tenth resistor are all grounded.

In some embodiments, the power status detection module includes a second resistor, a third resistor, a first capacitor, a first transistor, a second transistor, a fourth resistor, a fifth resistor, a third transistor, a first power supply, and a phase-shifting processing device;
a first end of the second resistor is connected to the second end of the secondary side of the first transformer, a second end of the second resistor is connected to an emitter of the first transistor, an end of the first capacitor, an end of the third resistor, a base of the second transistor, and an output of the phase-shifting processing device; a collector of the first transistor is connected to an emitter of the second transistor and a base of the third transistor, and connected to the first power supply and an emitter of the third transistor through the fifth resistor; a collector of the third transistor is connected to an I04 terminal of the control chip, and connected to a collector of the second transistor, another end of the third resistor, another end of the first capacitor, a base of the first transistor, and a ground terminal via the fourth resistor; an input of the phase-shifting processing device is connected to an I05 terminal of the control chip.

In some embodiments, the timing detection module includes a first inverter, a first processing chip, a seventh transistor, a third power supply, a seventeenth resistor, a fifth capacitor, an eighth transistor, and an eighteenth resistor;
an input of the first inverter is connected to a collector of the sixth transistor, and a B terminal of the first processing chip is connected to a collector of the third transistor; an output of the first inverter is connected to an A terminal of the first processing chip; an F terminal of the first processing chip is connected to a base of the seventh transistor, and a collector of the seventh transistor is connected to the third power supply and a collector of the eighth transistor; an emitter of the seventh transistor is connected to a base of the eighth transistor and an end of the fifth capacitor, and is grounded via the seventeenth resistor; an emitter of the eighth transistor is connected to an I06 terminal of the control chip, and connected to another end of the fifth capacitor and the ground terminal via the eighteenth resistor.

Compared with the related art, the beneficial effect of the present disclosure is that: the emergency protection system for UPS includes a power control module and an output processing module for voltage transmission and inversion processing, which provide the required power. A power status detection module cooperates with a first reference signal provided by a micro-control module to detect whether there is an abnormal power condition when AC power is connected. A voltage change detection module determines whether there is a sudden change in AC power. When there is an abnormal power condition or a sudden change, the micro-control module controls the power distribution control module to release the stored power from the energy storage module. When a power abnormality occurs and no sudden change in power occurs within a timing length, the micro-control module controls the power distribution control module to perform high-frequency power regulation, and superimposes it with the power transmitted by the output processing module through the power control module, to meet emergency power supply requirements. The power supply mode of the power distribution control module is controlled according to the power supply status of the power module to improve power supply efficiency and reduce consumption of the energy storage module.

BRIEF DESCRIPTION OF THE DRAWINGS

In order to more clearly illustrate the technical solution of the embodiments of the present disclosure, the following is a brief description of the drawings required to be used in the description of the embodiments of the present disclosure. Obviously, the drawings in the following description are only some embodiments of the present disclosure. For those skilled in the art, without the payment of creative labor, other drawings can also be obtained based on these drawings.

DETAILED DESCRIPTION

The following will describe the technical solution of the embodiments of the present disclosure in a clear and complete manner with reference to the accompanying drawings in the embodiments of the present disclosure. Obviously, the described embodiments are only a portion of the embodiments of the present disclosure, not all of the embodiments. All other embodiments obtained by those skilled in the art without creative effort based on the embodiments of the present disclosure fall within the scope of the present disclosure.

Figure 1:
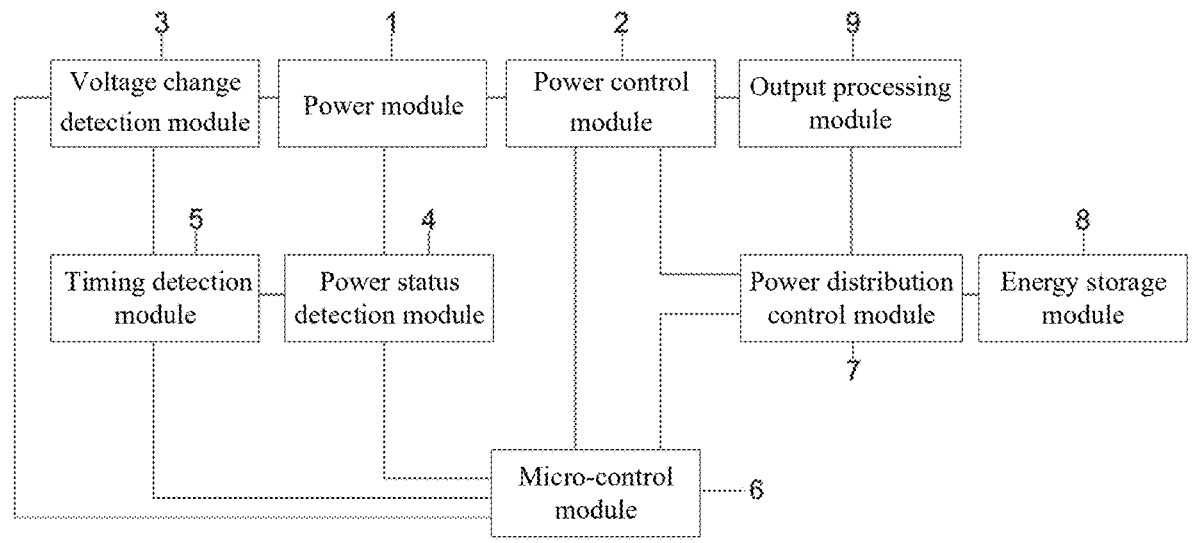
FIG. 1 is a schematic block diagram of an emergency protection system for a UPS according to some embodiments of the present disclosure.
Figure 2:
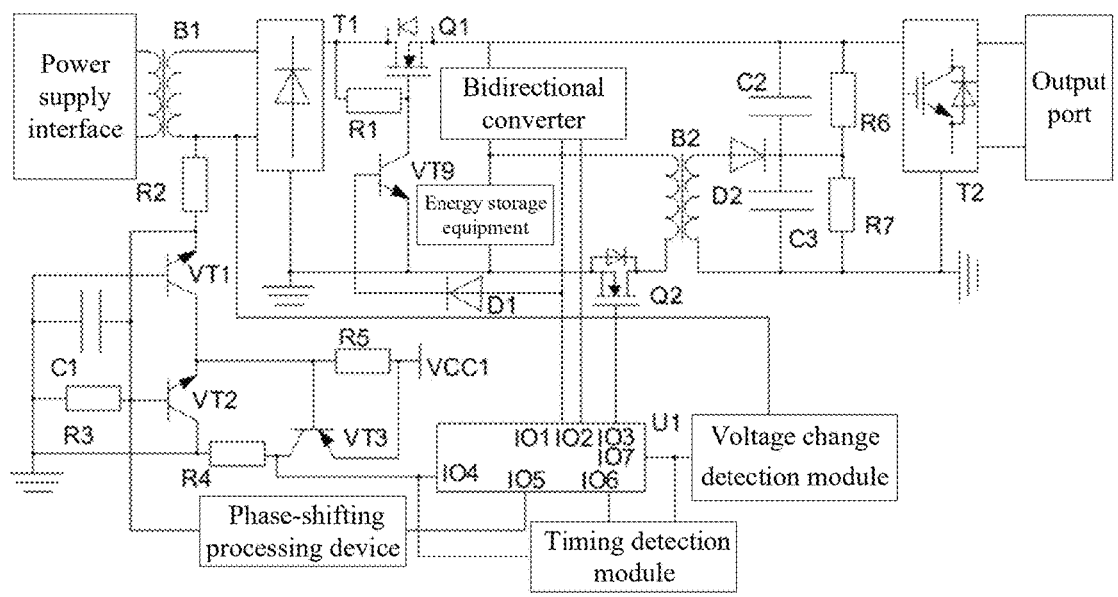
FIG. 2 is a circuit diagram of an emergency protection system for a UPS according to some embodiments of the present disclosure.
Figure 3:
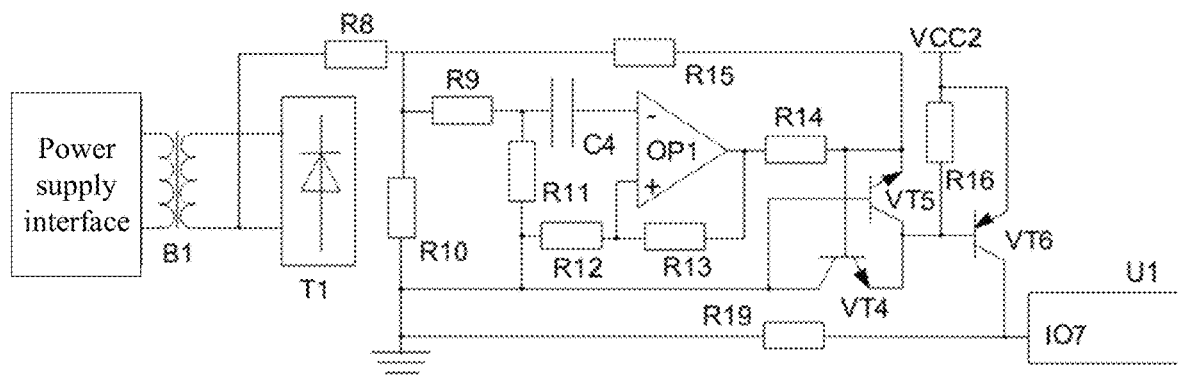
FIG. 3 is a circuit diagram of a voltage change detection module according to some embodiments of the present disclosure.
Figure 4:
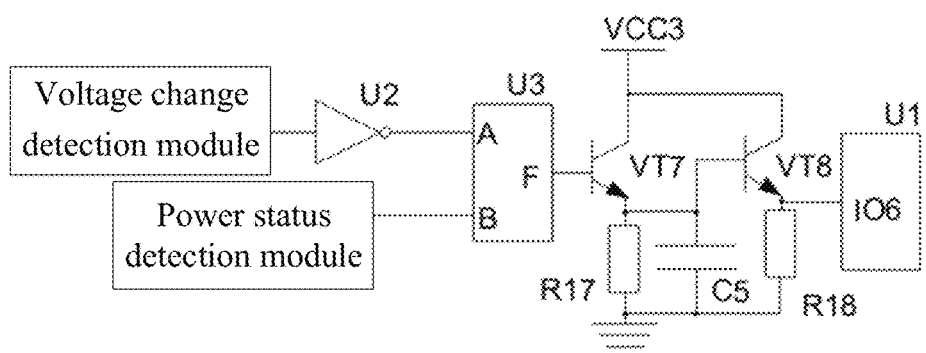
FIG. 4 is a circuit diagram of a timing detection module according to some embodiments of the present disclosure.

In some embodiments, referring to FIG. 1, the present disclosure provides an emergency protection system for a UPS, including: a power module 1, a power control module 2, a voltage change detection module 3, a power status detection module 4, a timing detection module 5, a micro-control module 6, a power distribution control module 7, an energy storage module 8, and an output processing module 9.

The power module 1 is configured to be connected to alternating current power and perform step-down and rectification processing on the alternating current power.

The power control module 2 is connected to the power module 1 and the micro-control module 6, for transmitting power after the rectification processing by the power module 1, and stopping transmitting the power in response to receiving a discharge signal output by the micro-control module 6.

The power status detection module 4 is connected to the power module 1 and the micro-control module 6, for performing a phase-shifting process on a first reference signal output by the micro-control module 6, performing a voltage division process on the power after the step-down processing by the power module 1 and superimposing the power after the voltage division process with the first reference signal after the phase-shifting process to output a first potential signal, and outputting a first control signal in condition of a potential of the first potential signal not being zero.

The voltage change detection module 3 is connected to the power module 1, for performing a voltage division process and a phase-shifting process on the power after the step-down processing by the power module 1, superimposing a signal output after the voltage division process with a signal output after the phase-shifting process and outputting a second potential signal, and outputting a second control signal in condition of a potential of the second potential signal not being zero.

The timing detection module 5 is connected to the voltage change detection module 3 and the power status detection module 4, for outputting a third control signal in condition of a time period for which the first control signal is received and the second control signal is not received exceeds a timing length.

The micro-control module 6 is connected to the timing detection module 5, the voltage change detection module 3, and the power distribution control module 7, for outputting the discharge signal and controlling the power distribution control module 7 to discharge in condition of the first control signal or the second control signal being received, outputting a first pulse signal and stopping outputting the discharge signal in condition of the third control signal being received, outputting a charging signal in condition of neither the first control signal nor the second control signal being received, and providing a first reference signal.

The power distribution control module 7 is connected to the power control module 2, the energy storage module 8, and the output processing module 9, for transmitting the power transmitted by the power control module 2 to the energy storage module 8 in response to receiving the charging signal, transmitting the power released by the energy storage module 8 to the output processing module 9 in response to receiving the discharging signal, and performing a high-frequency regulation processing on the power released by the energy storage module 8 in response to receiving the first pulse signal.

The energy storage module 8 is configured to store power and discharge.

The output processing module 9 is connected to the power control module 2, for superimposing the power transmitted by the power control module 2 with the power after the high-frequency regulation by the power distribution control module 7, and performing an invert processing on the power output after the superimposing, the power transmitted by the power distribution control module 7, and the power transmitted by the power control module 2 and transmitting the power after the invert processing to a connected electrical equipment.

In a specific embodiment, the power module 1 may be adopted with a power supply circuit including a power supply interface, a transformer, and a rectifier, which may be connected to AC power and perform step-down and rectification processing on the AC power; the power control module 2 may be adopted with a power control circuit including a field-effect tube, a resistor, and a transistor, which may control the transmission state of the power; the voltage change detection module 3 may be adopted with a voltage change detection circuit including a resistor, an operational amplifier, and a transistor, etc., which may phase-shift the AC power after the step-down processing by power module 1, and superimpose the phase-shifted signal on the original signal, so as to determine whether a sudden voltage change has occurred in the AC power; the power status detection module 4 may be adopted with a power status detection circuit including a transistor, a resistor, a phase-shifting processing device, etc., which may determine whether an abnormality has occurred in the AC power after the step-down processing by power module 1, i.e., whether there is a power outage, amplitude fluctuation, or abnormal waveform, based on a first reference signal provided by the micro-control module 6; the timing detection module 5 may be adopted with a timing detection circuit including a phase inverter, a logic chip, and a capacitor, which may set a timing length and determine whether the power remains in a non-abrupt state for a period longer than the timing length under abnormal voltage conditions, i.e. when the amplitude fluctuates; the micro-control module 6 may be adopted with a microcontroller including an arithmetic unit, a controller, a memory, and an input/output unit, which may perform functions such as signal processing, data storage, module control, and timing control; the power distribution control module 7 may be adopted with a power distribution control circuit including a transformer, a field-effect tube, a bidirectional converter, etc., which may perform bidirectional conversion and regulation processing of power, and may perform high-frequency power regulation processing; the energy storage module 8 may be adopted with an energy storage circuit including an energy storage equipment, which may perform power storage and power release; the output processing module 9 may be adopted with an output processing circuit including a capacitor, an inverter, an output port, etc., which may perform power superposition, power inversion, and power transmission.

In other embodiments, referring to FIGS. 1, 2, 3 and 4, the power module 1 includes a power supply interface, a first transformer B1, and a full-wave rectifier T1; the power control module 2 includes a first field-effect transistor Q1, a first resistor R1, a ninth transistor VT9, and a first diode D1; the micro-control module 6 includes a control chip U1.

Specifically, a first end and a second end of the power supply interface are connected to a first end and a second end of a primary side of the first transformer B1, and a first end and a second end of a secondary side of the first transformer B1 are connected to a first end and a second end of the full-wave rectifier T1. A third end of the full-wave rectifier T1 is connected to a drain of the first field-effect tube Q1 and connected to a gate of the first field-effect tube Q1 and a collector of the ninth transistor VT9 via the first resistor R1. An emitter of the ninth transistor VT9 is grounded, and a base of the ninth transistor VT9 is connected to a cathode the first diode D1. An anode of the first diode D1 is connected to an I01 terminal of the control chip U1, and a source of the first field-effect tube Q1 is connected to the output processing module 9 and the power distribution control module 7.

In a specific embodiment, the first field-effect tube Q1 may be an N-channel field-effect tube; the ninth transistor VT9 may be an NPN transistor.

Further, the power distribution control module 7 includes a bidirectional converter, a second transformer B2, a second diode D2, and a second field-effect tube Q2; the energy storage module 8 includes an energy storage equipment.

Specifically, a first end of the bidirectional converter is connected to the source of the first field-effect tube Q1, a second end of the bidirectional converter is connected to a first end of the energy storage equipment and a first end of a primary side of the second transformer B2, and a second end of the energy storage equipment and a source of the second field-effect tube Q2 are both connected to ground. A second end of the primary side of the second transformer B2 is connected to a drain of the second field-effect tube Q2. A first end of a secondary side of the second transformer B2 is connected to an anode of the second diode D2, a cathode of the second diode D2 is connected to the output processing module 9, and a second end of the secondary side of the second transformer B2 is grounded. A third end of the bidirectional converter is connected to the I01 terminal of the control chip U1, and a fourth end of the bidirectional converter is connected to an I02 terminal of the control chip U1. A gate of the second field-effect tube Q2 is connected to an I03 terminal of the control chip U1.

In a specific embodiment, the second transformer B2 may be a high-frequency transformer; the bidirectional converter may include a bidirectional Boost-Buck circuit to realize bidirectional regulation and transmission of power; the energy storage equipment may be a battery pack; and the second field-effect transistor Q2 may be an N-channel field-effect transistor to control the power transmission state of the second transformer B2.

Further, the output processing module 9 includes a second capacitor C2, a third capacitor C3, a sixth resistor R6, a seventh resistor R7, an inverter T2, and an output port.

Specifically, a first end of the second capacitor C2 is connected to a first end of the inverter T2 and the source of the first field-effect tube Q1, and connected to a second end of the second capacitor C2, an end of the seventh resistor R7, an end of the third capacitor C3, and the cathode of the second diode D2 via the sixth resistor R6. The other end of the seventh resistor R7, the other end of the third capacitor C3, and a second end of the inverter T2 are all connected to ground. A third end and a fourth end of the inverter T2 are connected to a first end and a second end of the output port.

In a specific embodiment, the sixth resistor R6 and seventh resistor R7 control the second capacitor C2 and third capacitor C3 to be at a voltage-equalized state; the inverter T2 may include four sets of IGBTs to achieve inverter operation.

Further, the voltage change detection module 3 includes an eighth resistor R8, a ninth resistor R9, a tenth resistor R10, an eleventh resistor R11, a twelfth resistor R12, a thirteenth resistor R13, a fourteenth resistor R14, a first operational amplifier OP1, a fifteenth resistor R15, a sixteenth resistor R16, a nineteenth resistor R19, a second power supply VCC2, a fourth transistor VT4, a fifth transistor VT5, and a sixth transistor VT6.

Specifically, an end of the eighth resistor R8 is connected to the second end of the secondary side of the first transformer B1. The other end of the eighth resistor R8 is connected to an end of the ninth resistor R9 and an end of the tenth resistor R10, and connected to an end of the fourteenth resistor R14, a base of the fourth transistor VT4, and an emitter of the fifth transistor VT5 via the fifteenth resistor R15. The other end of the ninth resistor R9 is connected to an end of the eleventh resistor R11, and connected to an inverting terminal of the first operational amplifier OP1 via the fourth capacitor. A non-inverting terminal of the first operational amplifier OP1 is connected to an end of the twelfth resistor R12, and connected to the other end of the fourteenth resistor R14 and an output of the first operational amplifier OP1 via the thirteenth resistor R13. An emitter of the fourth transistor VT4 is connected to a collector of the fifth transistor VT5 and a base of the sixth transistor VT6, and connected to the second power supply VCC2 and an emitter of the sixth transistor VT6 via the sixteenth resistor R16. A collector of the sixth transistor VT6 is connected to an I07 terminal of the control chip U1 and an end of the nineteenth resistor R19. The other end of the nineteenth resistor R19, a base of the fifth transistor VT5, the other end of the twelfth resistor R12, a Bluetooth of the eleventh resistor R11, and the other end of the tenth resistor R10 are all grounded.

In a specific embodiment, the first operational amplifier OP1 may be adopted with an OP07 operational amplifier, which, in conjunction with the ninth resistor R9, the eleventh resistor R11, the twelfth resistor R12, the thirteenth resistor R13, the fourth capacitor, and the fourteenth resistor R14, may perform a phase-shifting processing on an input sinusoidal voltage signal; the fourth transistor VT4 and fifth transistor VT5 may be adopted with NPN type transistors, for detecting a potential value between the fifteenth resistor R15 and the fourteenth resistor R14; the sixth transistor VT6 may be adopted with a PNP type transistor.

Further, the power status detection module 4 includes a second resistor R2, a third resistor R3, a first capacitor C1, a first transistor VT1, a second transistor VT2, a fourth resistor R4, a fifth resistor R5, a third transistor VT3, a first power supply VCC1, and a phase-shifting processing device.

Specifically, a first end of the second resistor R2 is connected to the second end of the secondary side of the first transformer B1, a second end of the second resistor R2 is connected to an emitter of the first transistor VT1, an end of the first capacitor C1, an end of the third resistor R3, a base of the second transistor VT2, and an output of the phase-shifting processing device. A collector of the first transistor VT1 is connected to an emitter of the second transistor VT2 and a base of the third transistor VT3, and is connected to the first power supply VCC1 and an emitter of the third transistor VT3 through the fifth resistor R5. A collector of the third transistor VT3 is connected to an I04 terminal of the control chip U1 and is connected to a collector of the second transistor VT2, the other end of the third resistor R3, the other end of the first capacitor C1, a base of the first transistor VT1 and the ground terminal via the fourth resistor R4. An input of the phase-shifting processing device is connected to an I05 terminal of the control chip U1.

In a specific embodiment, the circuit composition structure of the phase-shifting processing device may be the same as that of the first operational amplifier OP1, the ninth resistor R9, the eleventh resistor R11, the twelfth resistor R12, the thirteenth resistor R13, the fourth capacitor, and the fourteenth resistor R14, for performing a phase-shift filtering process on a first reference power supply provided by the 105 terminal of the control chip U1, where the frequency and phase of the first reference signal are the same as the frequency and phase of the AC power connected to power module 1; the first transistor VT1 and second transistor VT2 may be adopted with NPN type transistors, for detecting the potential between the second resistor R2 and third resistor R3; the third transistor VT3 may be adopted with a PNP type transistor.

Further, the timing detection module 5 includes a first inverter U2, a first processing chip U3, a seventh transistor VT7, a third power supply VCC3, a seventeenth resistor R17, a fifth capacitor C5, an eighth transistor VT8, and an eighteenth resistor R18.

Specifically, an input of the first inverter U2 is connected to a collector of the sixth transistor VT6, and a B terminal of the first processing chip U3 is connected to a collector of the third transistor VT3. An output of the first inverter U2 is connected to an A terminal of the first processing chip U3. An F terminal of the first processing chip U3 is connected to a base of the seventh transistor VT7, and a collector of the seventh transistor VT7 is connected to the third power supply VCC3 and a collector of the eighth transistor VT8. An emitter of the seventh transistor VT7 is connected to a base of the eighth transistor VT8 and an end of the fifth capacitor C5 and is grounded via the seventeenth resistor R17, and an emitter of the eighth transistor VT8 is connected to an I06 terminal of the control chip U1, and connected to the other end of the fifth capacitor C5 and the ground terminal via the eighteenth resistor R18.

In a specific embodiment, the first inverter U2 may be adopted with a NOT-gate chip; the first processing chip U3 may be adopted with an AND-gate chip; the seventh transistor VT7 and the second transistor VT2 may be adopted with NPN transistors, which are energized by the fifth capacitor C5 and timing controlled by the seventeenth resistor R17, the eighteenth resistor R18, and the third power supply VCC3.

In the embodiments of the emergency protection system for UPS, AC power is connected via the power interface, step-down processing is performed by the first transformer B1, rectification processing is performed by the full-wave rectifier T1, the first field-effect tube Q1 is triggered to conduct by the first resistor R1, and the input power is transmitted to the inverter T2 and the bidirectional converter. When the power supply is normal, the inverter T2 inverts and provides power to the output port. The I02 terminal of the control chip U1 controls the bidirectional converter to supply power to the energy storage equipment, while the 105 terminal of the control chip U1 provides the first reference signal. The frequency and amplitude of this first reference signal are the same as those of the AC power after step-down processing by the power module 1 when it is normal and stable. The first reference signal is phase-shifted and filtered by the phase-shifting processing device, and then superimposed with the signals obtained by voltage division by the second resistor R2 and the third resistor R3. When the power after the step-down is not disconnected, the amplitude does not fluctuate, or the waveform is not abnormal, the potential between the second resistor R2 and the third resistor R3 is zero. At the same time, the eighth resistor R8 and the tenth resistor R10 also undergo voltage division processing. The processed signal is phase-shifted through the first operational amplifier OP1, the ninth resistor R9, the eleventh resistor R11, the twelfth resistor R12, the thirteenth resistor R13, the fourth capacitor, and the fourteenth resistor R14, and superimposed with the original divided signal. In this case, when there is no sudden change in voltage, the potential between the eighth resistor R8 and the tenth resistor R10 is zero. When the power supply is disconnected, the amplitude fluctuates, or the waveform is abnormal, one of the first transistor VT1 and the second transistor VT2 will be turned on, causing the third transistor VT3 to be turned on, and the 104 terminal of the control chip U1 to get a high level. When the power supply undergoes sudden changes, one of the fourth transistor VT4 and the fifth transistor VT5 will be turned on, causing the sixth transistor VT6 to be turned on, and the 107 terminal of the control chip U1 to get a high level, such that the I01 terminal of the control chip U1 controls the bidirectional converter to release the stored energy of the energy storage equipment, controls the ninth transistor VT9 to turn on, controls the first field-effect transistor Q1 to be turned off, and emergency power supply is carried out by the energy storage equipment. When the amplitude of the power after step-down is lower than the amplitude of the first reference signal, there is no sudden change in the power supply, and the duration of the no sudden change exceeds the set timing length, that is, when the stored power in the fifth capacitor C5 reaches a certain value, the time required to trigger the eighth transistor VT8 to turn on is reached. In this case, the eighth transistor VT8 is turned on, and the I06 terminal of the control chip U1 gets a high level, at which time the I01 terminal of the control chip U1 stops outputting signals, and the I03 terminal of the control chip U1 outputs the first pulse signal, controlling the second field-effect tube Q2 to be turned on, such that the second transformer B2 carries out high-frequency regulation, and the second diode D2 carries out rectification. The rectified power is stored by the third capacitor C3, and superimposed with the power stored with the second capacitor C2 to meet the power supply requirements.

It is obvious to one skilled in the art that the present disclosure is not limited to the details of the exemplary embodiments described above, and that the present disclosure can be implemented in other specific forms without departing from the spirit or essential features of the present disclosure. Thus, the embodiments should be regarded as exemplary and non-limiting in every respect, and the scope of the present disclosure is defined by the appended claims rather than the above description, such that so that all changes that fall within the meaning and scope of the equivalent elements of the claims are intended to be included in the present disclosure. Any appended marks in the claims should not be regarded as limiting the claims involved.

In addition, it should be understood that although the specification is described according to embodiments, not every embodiment contains only one independent technical solution. This narrative style of the specification is only for clarity, and those skilled in the art should consider the specification as a whole. The technical solutions in the embodiments may be combined appropriately to form other embodiments that can be understood by those skilled in the art.

What is claimed is:

1. An emergency protection system for an uninterruptible power supply, comprising: a power module, a power control module, a voltage change detection module, a power status detection module, a timing detection module, a micro-control module, a power distribution control module, an energy storage module, and an output processing module;

wherein the power module is configured to be connected to alternating current power and perform step-down and rectification processing on the alternating current power;

the power control module is connected to the power module and the micro-control module; and is configured to transmit power after the rectification processing by the power module, and stop transmitting the power in response to receiving a discharge signal output by the micro-control module;

the power status detection module is connected to the power module and the micro-control module; and is configured to perform a phase-shifting process on a first reference signal output by the micro-control module, perform a voltage division process on the power after the step-down processing by the power module and superimpose the power after the voltage division process with the first reference signal after the phase-shifting process to output a first potential signal, and output a first control signal in condition of a potential of the first potential signal not being zero;

the voltage change detection module is connected to the power module and is configured to perform another voltage division process and another phase-shifting process on the power after the step-down processing by the power module, superimpose a signal output after the other voltage division process with a signal output after the other phase-shifting process to output a second potential signal, and output a second control signal in condition of a potential of the second potential signal not being zero;

the timing detection module is connected to the voltage change detection module and the power status detection module; and is configured to output a third control signal in condition of a time period for which the first control signal is received and the second control signal is not received exceeds a timing length;

the micro-control module is connected to the timing detection module, the voltage change detection module, and the power distribution control module; and is configured to output the discharge signal and control the power distribution control module to discharge in condition of the first control signal or the second control signal being received, output a first pulse signal and stop outputting the discharge signal in condition of the third control signal being received, output a charging signal in condition of neither the first control signal nor the second control signal being received, and provide the first reference signal;

the power distribution control module is connected to the power control module, the energy storage module, and the output processing module; and is configured to transmit power transmitted by the power control module to the energy storage module in response to receiving the charging signal, transmit power released by the energy storage module to the output processing module in response to receiving the discharging signal, and perform a high-frequency regulation processing on the power released by the energy storage module in response to receiving the first pulse signal;

the energy storage module is configured to store power and discharge;

the output processing module is connected to the power control module; and is configured to superimpose the power transmitted by the power control module with power after the high-frequency regulation by the power distribution control module, and perform an invert processing on power output after the superimposing, power transmitted by the power distribution control module, and the power transmitted by the power control module and transmit power after the invert processing to a connected electrical equipment.

2. The emergency protection system according to claim 1, wherein the power module comprises a power supply interface, a first transformer, and a full-wave rectifier; the power control module comprises a first field-effect transistor, a first resistor, a ninth transistor, and a first diode; the micro-control module comprises a control chip;

a first end and a second end of the power supply interface are connected to a first end and a second end of a primary side of the first transformer, and a first end and a second end of a secondary side of the first transformer are connected to a first end and a second end of the full-wave rectifier; a third end of the full-wave rectifier is connected to a drain of the first field-effect tube, and connected to a gate of the first field-effect tube and a collector of the ninth transistor via the first resistor; an emitter of the ninth transistor is grounded, and a base of the ninth transistor is connected to a cathode of first diode; an anode of the first diode is connected to an I01 terminal of the control chip, and a source of the first field-effect tube is connected to the output processing module and the power distribution control module.

3. The emergency protection system according to claim 2, wherein the power distribution control module comprises a bidirectional converter, a second transformer, a second diode, and a second field-effect tube; the energy storage module comprises an energy storage equipment;

a first end of the bidirectional converter is connected to the source of the first field-effect tube, a second end of the bidirectional converter is connected to a first end of the energy storage equipment and a first end of a primary side of the second transformer, and a second end of the energy storage equipment and a source of the second field-effect tube are both grounded; a second end of the primary side of the second transformer is connected to a drain of the second field-effect tube; a first end of a secondary side of the second transformer is connected to an anode of the second diode, a cathode of the second diode is connected to the output processing module, and a second end of the secondary side of the second transformer is grounded; a third end of the bidirectional converter is connected to the I01 terminal of the control chip, and a fourth end of the bidirectional converter is connected to an I02 terminal of the control chip; a gate of the second field-effect tube is connected to an I03 terminal of the control chip.

4. The emergency protection system according to claim 3, wherein the output processing module comprises a second capacitor, a third capacitor, a sixth resistor, a seventh resistor, an inverter, and an output port;

a first end of the second capacitor is connected to a first end of the inverter and the source of the first field-effect tube, and connected to a second end of the second capacitor, an end of the seventh resistor, an end of the third capacitor, and the cathode of the second diode via the sixth resistor; another end of the seventh resistor, another end of the third capacitor, and a second end of the inverter are all grounded; a third end and a fourth end of the inverter are connected to a first end and a second end of the output port.

5. The emergency protection system according to claim 2, wherein the voltage change detection module comprises an eighth resistor, a ninth resistor, a tenth resistor, an eleventh resistor, a twelfth resistor, a thirteenth resistor, a fourteenth resistor, a first operational amplifier, a fifteenth resistor, a sixteenth resistor, a nineteenth resistor, a second power supply, a fourth transistor, a fifth transistor, and a sixth transistor;

an end of the eighth resistor is connected to the second end of the secondary side of the first transformer, and another end of the eighth resistor is connected to an end of the ninth resistor and an end of the tenth resistor, and is connected to an end of the fourteenth resistor, a base of the fourth transistor, and an emitter of the fifth transistor via the fifteenth resistor; another end of the ninth resistor is connected to an end of the eleventh resistor, and connected to an inverting terminal of the first operational amplifier via the fourth capacitor; a non-inverting terminal of the first operational amplifier is connected to an end of the twelfth resistor, and connected to another end of the fourteenth resistor and an output of the first operational amplifier via the thirteenth resistor; an emitter of the fourth transistor is connected to a collector of the fifth transistor and a base of the sixth transistor, and connected to the second power supply and an emitter of the sixth transistor via the sixteenth resistor; a collector of the sixth transistor is connected to an I07 terminal of the control chip and an end of the nineteenth resistor; another end of the nineteenth resistor, a base of the fifth transistor, another end of the twelfth resistor, a Bluetooth of the eleventh resistor, and another end of the tenth resistor are all grounded.

6. The emergency protection system according to claim 5, wherein the power status detection module comprises a second resistor, a third resistor, a first capacitor, a first transistor, a second transistor, a fourth resistor, a fifth resistor, a third transistor, a first power supply, and a phase-shifting processing device;

a first end of the second resistor is connected to the second end of the secondary side of the first transformer, a second end of the second resistor is connected to an emitter of the first transistor, an end of the first capacitor, an end of the third resistor, a base of the second transistor, and an output of the phase-shifting processing device; a collector of the first transistor is connected to an emitter of the second transistor and a base of the third transistor, and connected to the first power supply and an emitter of the third transistor through the fifth resistor; a collector of the third transistor is connected to an I04 terminal of the control chip, and connected to a collector of the second transistor, another end of the third resistor, another end of the first capacitor, a base of the first transistor, and a ground terminal via the fourth resistor; an input of the phase-shifting processing device is connected to an I05 terminal of the control chip.

7. The emergency protection system according to claim 6, wherein the timing detection module comprises a first inverter, a first processing chip, a seventh transistor, a third power supply, a seventeenth resistor, a fifth capacitor, an eighth transistor, and an eighteenth resistor;

an input of the first inverter is connected to a collector of the sixth transistor, and a B terminal of the first processing chip is connected to a collector of the third transistor; an output of the first inverter is connected to an A terminal of the first processing chip; an F terminal of the first processing chip is connected to a base of the seventh transistor, and a collector of the seventh transistor is connected to the third power supply and a collector of the eighth transistor; an emitter of the seventh transistor is connected to a base of the eighth transistor and an end of the fifth capacitor, and is grounded via the seventeenth resistor; an emitter of the eighth transistor is connected to an I06 terminal of the control chip, and connected to another end of the fifth capacitor and the ground terminal via the eighteenth resistor.

* * * * *